(12) United States Patent
Arokiaswamy

(10) Patent No.: US 7,430,712 B2
(45) Date of Patent: Sep. 30, 2008

(54) SYSTEM AND METHOD FOR DYNAMICALLY RESIZING EMBEDED WEB PAGE CONTENT

(75) Inventor: Prabhu Arokiaswamy, Maple Grove, MN (US)

(73) Assignee: Ameriprise Financial, Inc., Minneapolis, MN (US)

( * ) Notice: Subject to any disclaimer, the term of this patent is extended or adjusted under 35 U.S.C. 154(b) by 520 days.

(21) Appl. No.: 10/907,019

(22) Filed: Mar. 16, 2005

(65) Prior Publication Data

US 2006/0212803 A1  Sep. 21, 2006

(51) Int. Cl.
*G06N 3/00* (2006.01)
(52) U.S. Cl. ....................................... 715/234
(58) Field of Classification Search .................. 715/500, 715/513, 517, 523, 530, 234, 244, 254
See application file for complete search history.

(56) References Cited

U.S. PATENT DOCUMENTS

2002/0196273 A1* 12/2002 Krause ....................... 345/738

2006/0136551 A1* 6/2006 Amidon et al. ............. 709/203

OTHER PUBLICATIONS

"HTML 4.01 Specification," Dec. 24, 1999, Chapters 16 and 17, available from: <http://www.w3.org/TR/html401/>.*

* cited by examiner

*Primary Examiner*—Stephen Hong
*Assistant Examiner*—Kyle R Stork
(74) *Attorney, Agent, or Firm*—Snell & Wilmer L.L.P.

(57) ABSTRACT

A system and method for extending the utility of an HTML IFrame web page element by enabling the IFrame to dynamically resize its viewing boundaries according to the vertical and horizontal dimensions of the secondary content to be displayed within the IFrame is disclosed. The extended IFrame determines the height and width dimensions of the secondary content, stores the dimensions within cookies, renders the secondary content within the IFrame, calls a function to retrieve dimension values from the cookies and sets the height and width attributes of the IFrame to resize the IFrame.

18 Claims, 4 Drawing Sheets

SYSTEM AND METHOD FOR DYNAMICALLY RESIZING EMBEDED WEB PAGE CONTENT

COPYRIGHT CLAIM

A portion of the disclosure of this patent document contains material to which a claim for copyright is made. The copyright owner has no objection to the facsimile reproduction by anyone of the patent document or patent disclosure, as it appears in the Patent and Trademark Office patent file or records, but reserves all other copyrights whatsoever.

FIELD OF INVENTION

The invention generally relates to embedding content from a secondary web site and/or webpage within the content of a primary web page, and more particularly, to a system and method for dynamically resizing a portal frame based on the physical size of secondary content to improve web page presentation and usability.

BACKGROUND OF INVENTION

Many advances have been made with Internet technology since the Internet expanded in the mid to late 1990's. In particular, innovations in web technology have lead to a more robust and user-friendly medium for businesses, organizations and individuals to conduct trade and provide information. In general, the more complex the interface, the more bandwidth required to load the interface to an end-user's computer. Web pages containing complex graphics, photos, video and sound would not have been practical under the slow dial-up configurations that were predominate during the early years of the Internet. As such, emphasis has been placed on solving the challenge of producing eye-catching and interesting interfaces designed to keep the attention of the user, while minimizing the time that the user is required to wait for such an interface to load.

Today, most corporations and organizations are equipped with high-speed Internet connections through dedicated lines such as a T1 line or a Digital Subscriber Line (DSL). An increasing number of households have high-speed broadband Internet connections through cable and satellite, so many of the concerns regarding complex content have significantly diminished. As a result, web site architects, developers and administrators are able to pack more information into each web page. This includes the ability to display multiple secondary web pages within the content of a primary web page. In doing so, web site providers are better able to prevent user from navigating away from a web page to view other information. For example, an investment firm may provide a web page containing information concerning a variety of service offerings. One such service offering may include online buying and selling of stock shares. Therefore, the investment firm may include a frame within its primary web page content which displays stock ticker content from a secondary Uniform Resource Locator (URL).

Hypertext Markup Language (HTML) provides a mechanism for quickly and easily adding a secondary URL frame to a web page. Such a mechanism is the HTML IFrame element which defines an inline frame for the inclusion of external object including other HTML documents. That is, IFrame is preconfigured to enable a web page developer to include an IFrame reference within the HTML of a web page, and to designate the URL that is to be loaded into the IFrame, as the primary web page is being loaded into the user's browser application. However, IFrame lacks the functionality to be dynamically resized based upon the size of the referenced content. To compensate for this, IFrame automatically displays vertical and horizontal scroll bars when the content is larger than the frame area. This enables the user to scroll in order to view areas of the secondary content that are not visible within the boundaries of the IFrame. However, when secondary content also contains scrollbars, the user is presented with a confusing and difficult to use IFrame, in that there are now two sets of vertical and horizontal scrollbars.

Therefore, a need exists for a system and method for displaying secondary web page content within a frame of a primary web page and dynamically determining the size of the secondary content to resize the frame accordingly.

SUMMARY OF INVENTION

The invention includes a system and method to first determine the vertical and horizontal dimensions of a secondary web page and then dynamically size a portal frame to properly accommodate the secondary web page within a primary web page. The invention extends the functionality of an HTML IFrame which currently does not support dynamic resizing according to the dimensions of a secondary web page.

BRIEF DESCRIPTION OF THE DRAWINGS

A more complete understanding of the invention may be derived by referring to the detailed description and claims when considered in connection with the Figures, wherein like reference numbers refer to similar elements throughout the Figures, and:

DETAILED DESCRIPTION

The detailed description of exemplary embodiments of the invention herein makes reference to the accompanying drawings, which show the exemplary embodiment by way of illustration and its best mode. While these exemplary embodiments are described in sufficient detail to enable those skilled in the art to practice the invention, it should be understood that other embodiments may be realized and that logical and mechanical changes may be made without departing from the spirit and scope of the invention. Thus, the detailed description herein is presented for purposes of illustration only and not of limitation.

Figure 1:
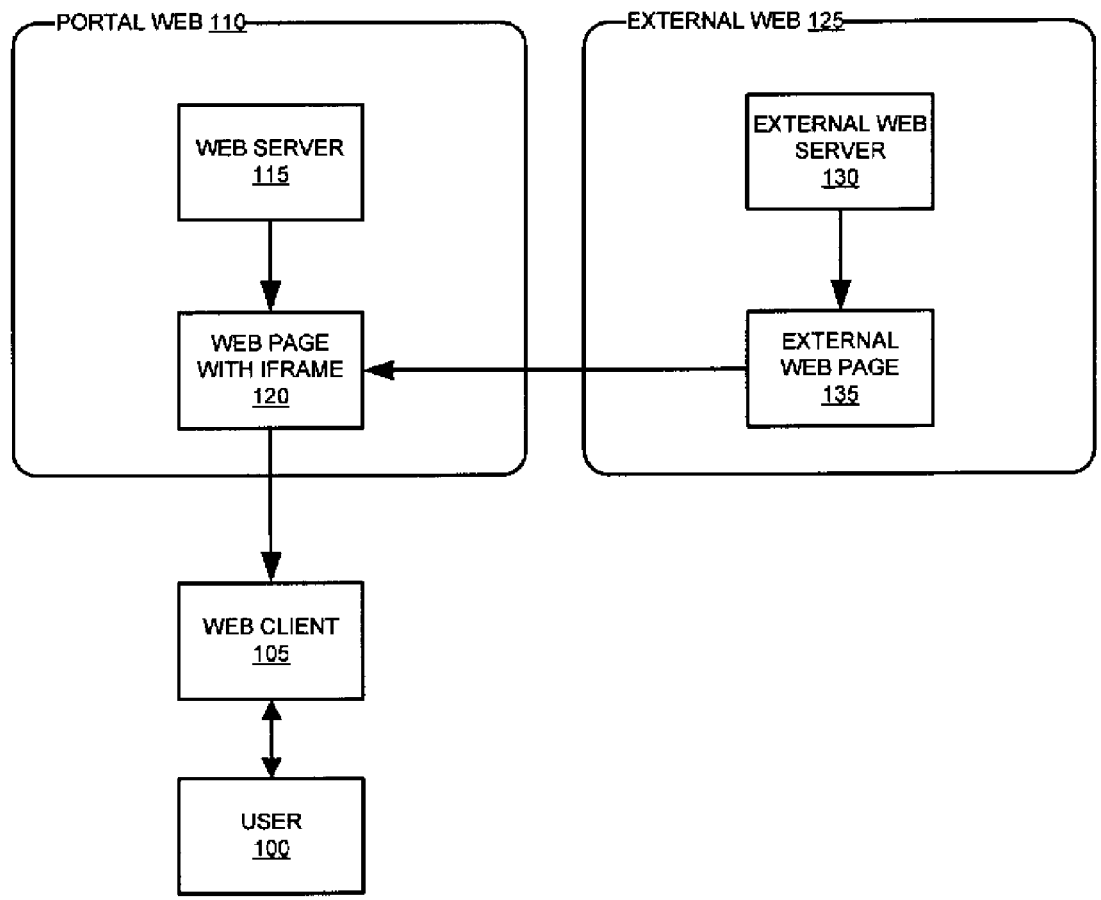
FIG. 1 is a block diagram illustrating the major system components for an exemplary dynamic portal frame according to an embodiment of the invention.

In general, with reference to FIG. 1, exemplary system 90 includes a system and method for dynamically resizing a portal frame within a web page to the dimensions of content from a secondary web page. In one embodiment, system 90 is configured to determine the height and width of secondary web page content as it is loaded within a browser application and resizes the secondary content accordingly. System 90 facilitates interaction between user 100 and portal web 110 through a web client 105. Web client 105 is connected to a web server 115 through a network connection (e.g., Internet, Intranet, LAN, WAN). Web server 115 may retrieve a requested dynamic frame web page 120 and transmit it in the form of an HTML stream to be rendered at web client 105.

Dynamic frame web page 120 includes an extension of the HTML IFrame to display an external web page 135. IFrame is an inline frame which enables developers to embed one or more other HTML documents into a single HTML document. The inline frame's embedded data is displayed inside a sub-window of the browser's window. Although it may appear to users that they are viewing a single document, the two or more documents are independent, and each are treated as complete documents, instead of treating one as part of the other. Therefore, each document may have its own unique set of hyperlinks, user interface controls and functions. Those skilled in the art will appreciate that while the inline frame is herein referred to as an IFrame, the system 90 may be equally applicable to any number of various inline frame configurations.

In addition to the components discussed above, portal web 110 may further include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of system 90.

Figure 2:
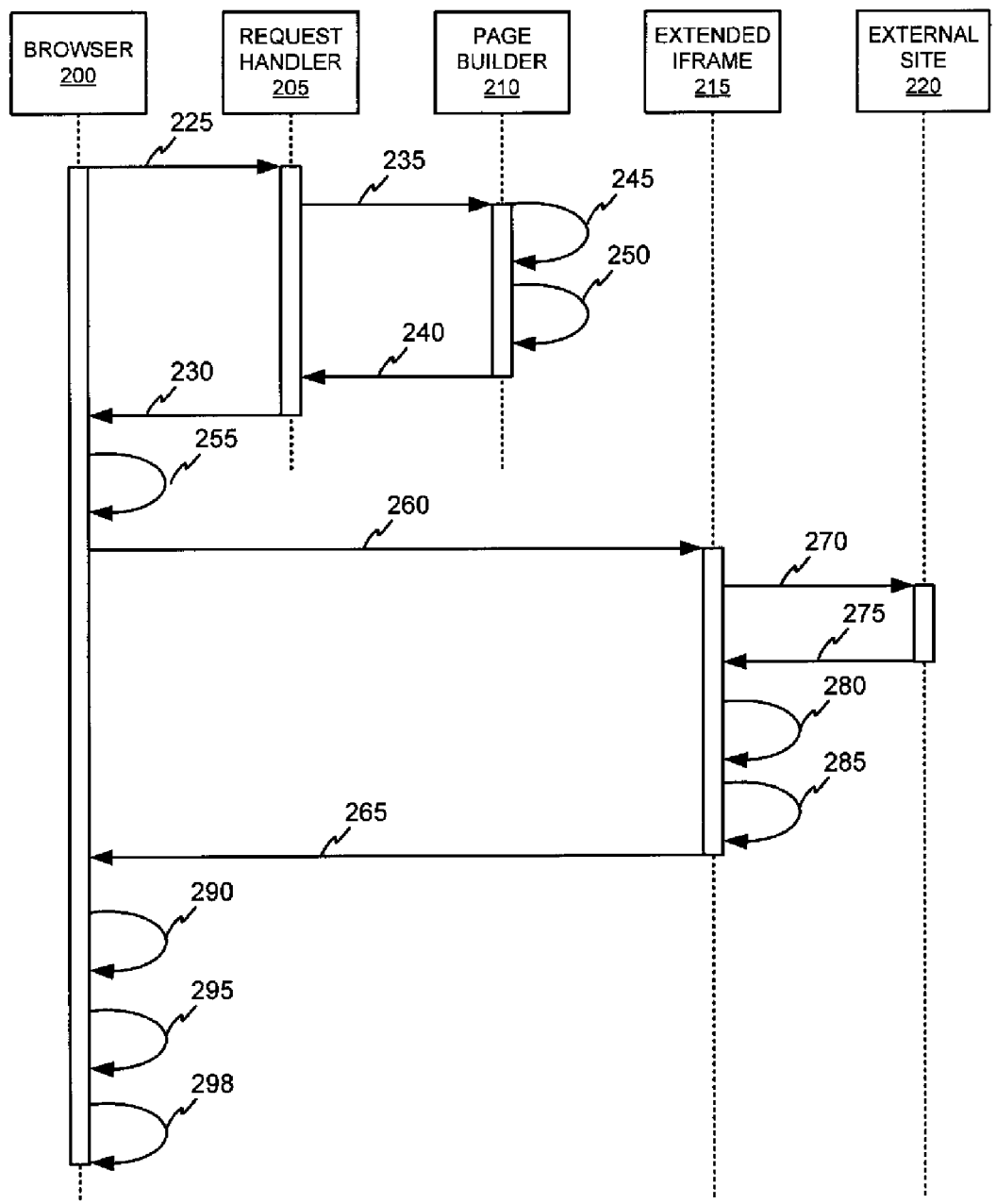
FIG. 2 is a flowchart illustrating an exemplary process for resizing web page content according to the size of the portal frame according to an embodiment of the invention.
Figure 3:
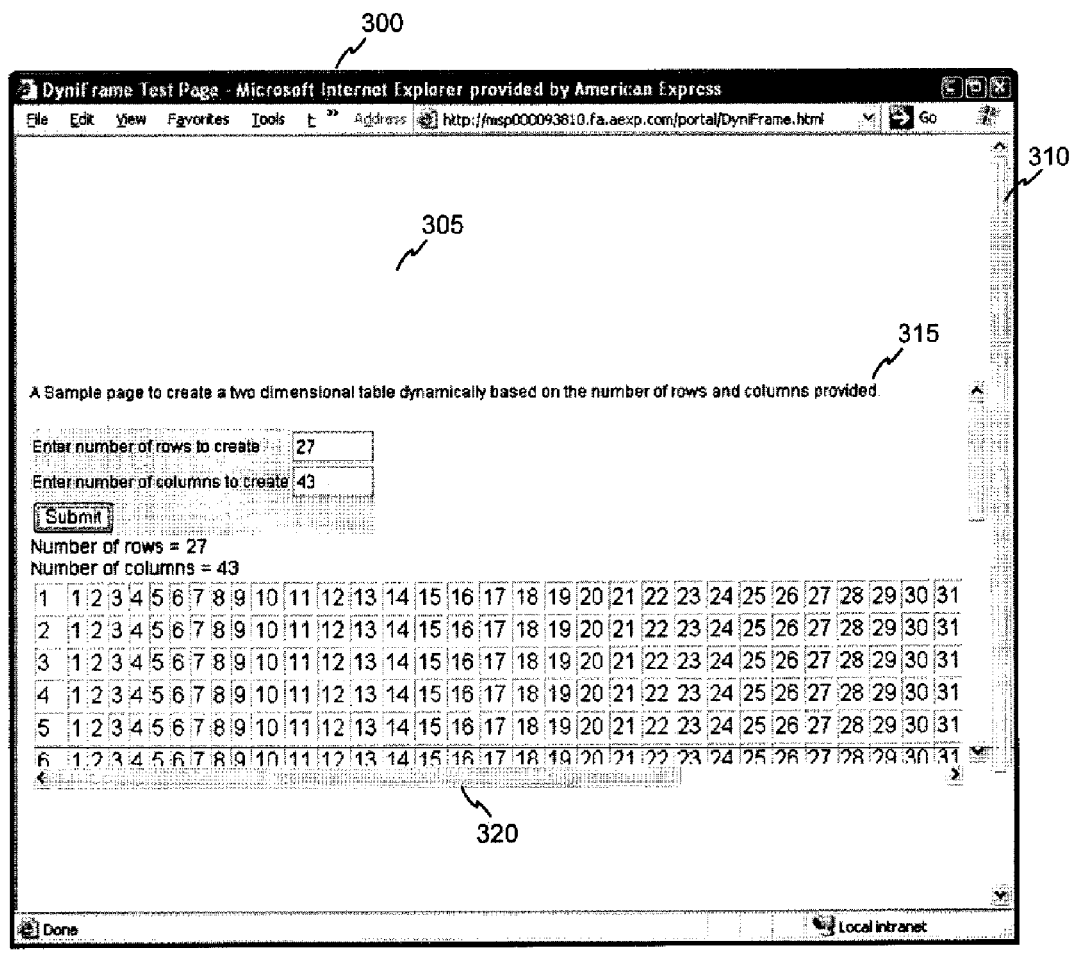
FIG. 3 is a screenshot of exemplary web page content as displayed within the portal frame of the prior art.
Figure 4:
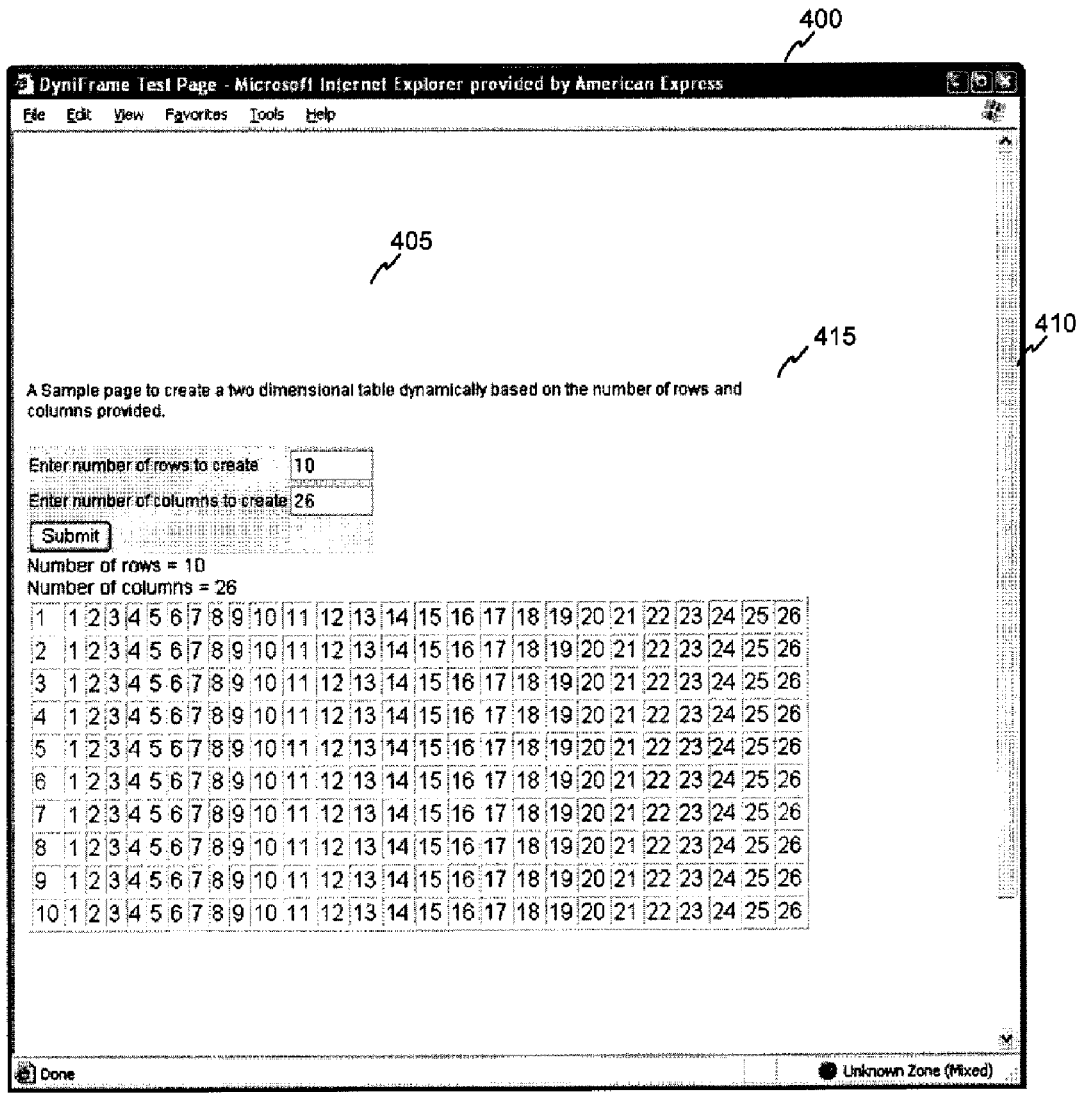
FIG. 4 is a screenshot of an exemplary dynamic portal frame wherein web page content is resized to fit within the dimensions of the dynamic portal frame according to an embodiment of the invention.

Referring now to FIGS. 2 and 4, the process flow and screenshots depict mere embodiments of system 90 and the functionality capable of being provided therein. They are not intended to limit the scope of the invention as described herein. For example, the steps recited in any of the process description may be executed in any order and is not limited to the order presented. It will be appreciated that the following description makes appropriate references not only to the steps and user interface elements depicted in FIGS. 3 and 4, but also to the various system components as described above with reference to FIG. 1.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

FIG. 2 is a flowchart illustrating an exemplary process for resizing web page content according to the size of the portal frame. User 100 at browser 200 selects a URL or web page link to request a web page (step 200). The request is received at web server 115 where a request handler 205 processes the request and sends a call to a page builder 210 to assemble the various elements of the requested web page (step 235). The page builder 210 inserts content into the web page (step 245) and also inserts an HTML IFrame within the web page (step 250). The IFrame accepts a URL source for an internal or external web page which is to be displayed within the IFrame when rendered at browser 200. The source is inserted by the page builder 210 and the assembled web page comprising primary content is returned to the request handler (step 240) where it is further transmitted to browser 200 within an HTML stream (step 230). On receiving the HTML stream, browser 200 renders web page (step 255).

When secondary web page content is rendered (step 260) within IFrame 215, the height and width of the viewing area is set to IFrame default values. The source URL is read from the IFrame source property in order to retrieve the secondary content from an external site (step 270). An external site 220 may include any web site that is accessible by the general public or by way of authentication wherein the user has been issued authentication credentials. Those skilled in the art will appreciate that while reference is made to an external site 220, the primary and secondary content may be from the same web site or an internal website or any database.

When secondary content is received at web client (step 275), a browser application renders the secondary content within the IFrame component (step 280). When the rendering is complete, the source page generates a "complete" trigger message which is captured by the "onreadystatechange" event. In response, IFrame retrieves the secondary content height and width values from the document object using the properties, "document.body.scrollHeight" and also the greater of either the "document.body.offsetWidth" or "document.body.scrollWidth" properties. Because the web is inherently a stateless environment, the extended IFrame writes the content height and width values within the memory (step 285) of web client 105. For example, the height and width values of the secondary content may be written to a cookie as, "<IFrameName>Height" and "<IFrameName>Width". Those skilled in the art will appreciate that the height and width values may be stored within separate cookies to reduce the string manipulation required to later extract the values. In another embodiment, it would be possible to store the values in the hidden field of the source page only if the content is from the same domain, else it will not be accessible because the IFrame will restrict access to the document object of the IFrame.

When the secondary content is fully loaded within the IFrame, the document object of the parent page receives a "readyStateChange" event (step 290). On this event, a resize-Frame JavaScript function is called such as, for example, "<iframe onreadystatechange=ResizeFrame( )". The JavaScript function retrieves the height and width values from the cookie (e.g. "<IFrameName>Height" and "<IFrameName>Width") and sets the IFrame height and width properties accordingly (step 295). This results in the removal of scrollbar(s) within the IFrame because the content area is not greater than the available viewing area of the IFrame. Otherwise, if the IFrame area is larger than the secondary content, the IFrame will reduce its viewing area sufficiently to fit the content of the secondary content and thereby eliminate the need to display scrollbars. The following is an example of a JavaScript function responsive to a "readyStateChange" event as described above.

```
document.onreadystatechange=setFrameDim;
   function setFrameDim( )
   {
     if (document.readyState == "complete")   {
       document.cookie = "IFRAMEContentHeight=" +
   document.body.scrollHeight + ";path=/;domain=.aexp.com";
       var wt;
       wt = (document.body.offsetWidth > document.body.scrollWidth) ?
                  document.body.offsetWidth :
   document.body.scrollWidth;
       document.cookie = "IFRAMEContentWidth=" + wt +
   ";path=/;domain=.aexp.com";
```

-continued

```
    }
}
```

A source code example of an extended IFrame enabled JSP is included at the end of this disclosure. The JavaScript examples presented above and at the end of this disclosure are provided for explanation only and do not limit the scope of the invention. Those skilled in the art will appreciate that the examples as provided may be written in any Web enabled scripting language and the functionality produced by the examples may be encapsulated within any number of methods, functions, procedures and the like.

When the IFrame has changed its viewing area based on the new height and width, it may overlap a portion of the primary web page content. In this case, the browser window is resized by (+1, +1) and next by (−1, −1), so the browser readjusts the entire content of the web page (step 298). More specifically, when the IFrame is resized and the ResizeFrame function has been called, the window.resizeBy(−1, −1) function is called; alerting the browser application that a change in the display has occurred and that it must readjust its content accordingly. When the content is readjusted such that the newly sized IFrame is not overlapping any of the primary page content, the browser window is resized to its original height and width by calling the function window.resizeBy(1, 1). This results in retaining the original size of the browser, and at the same time, invoking the primary page to rearrange its content.

FIG. 3 is a screenshot of web page content as displayed within the portal frame of the prior art. When primary web page content 305 is rendered by browser 300, it includes an IFrame component 315 that is capable of displaying secondary content from a different source. For example, primary content 305 may be provided by an online merchant for a variety of products from various manufacturers. As a user is viewing pricing information contained within primary content 305, they may further review product specifics from the manufacturer's web site via the IFrame component. While IFrame 320 provides web page developers a convenient tool to develop portal web pages, the tool lacks the ability to dynamically size to the dimensions of the secondary content. Therefore, if the secondary content is larger than the specified size of the IFrame, vertical and/or horizontal scrollbars 320 will be displayed within the IFrame to enable a user to view the entirety of the secondary content. As a result, the user may be presented two sets of scrollbars; one for primary content 310 and the other for secondary content 320. This can add to the complexity of the web page leading to an undesirable experience for the user.

FIG. 4 is a screenshot of an exemplary dynamic portal frame wherein web page content is resized to fit within the dimensions of the dynamic portal frame. The IFrame component 415 as shown does not include scrollbars because the IFrame vertical and horizontal dimensions have been dynamically set to match those of the secondary content. If the area of the secondary content exceeds that of that of the primary content 404, the primary content vertical and horizontal dimensions are increased which may increase the scrollable area of the primary content, however the complexity of two sets of scrollbars have been removed.

An additional benefit of the dynamic portal frame as disclosed above is that it enables an exchange of data between a primary web page and secondary content. IFrame in of itself does not provide such capability because it has been engineered to not allow data exchange because of security concerns. However, in many cases there are valid reasons for such a data exchange.

The dynamic portal frame also overcomes an IFrame limitation in that when a primary page is loaded, the IFrame Source URL property is set to the URL of the secondary content. If after the secondary content has loaded and the user navigates within the IFrame to other links (e.g. another web page of the embedded site), refreshing the web page results in the entire primary web page being reloaded, thereby causing the secondary page to also reload. The reload of the secondary content within the IFrame component now reverts to the secondary content referred in the Source URL property of the IFrame. To resolve this issue, when the secondary content within the IFrame changes, the URL is stored within a cookie as described in reference to storing the height and width values. Thereafter, when a browser refresh occurs the primary web page retrieves the previous URL value from the cookie and sets the IFrame source URL property accordingly. If no URL value is stored in a cookie, the URL property defaults to the original value.

As will be appreciated by one of ordinary skill in the art, system 90 may be embodied as a customization of an existing system, an add-on product, upgraded software, a stand alone system (e.g., kiosk), a distributed system, a method, a data processing system, a device for data processing, and/or a computer program product. Accordingly, system 90 may take the form of an entirely software embodiment, an entirely hardware embodiment, or an embodiment combining aspects of both software and hardware. Furthermore, system 90 may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

User 100 may include any individual, business, entity, government organization, software and/or hardware which interact with system 90 to view a dynamic frame web page 120 via a browser application. User 100 may interface with portal web 110 via any communication protocol, device or method discussed herein or known in the art. In one embodiment, user 100 may interact with system 90 via an Internet browser at a web client 105.

Web client 105 may comprise any hardware and/or software suitably configured to facilitate input, receipt and/or review of any information related to portal web 110 and/or external web 125. Web client 105 may include any device (e.g., personal computer), which communicates (in any manner discussed herein) with a web server 115 via any network discussed herein. Such browser applications comprise Internet browsing software installed within a computing unit or system to conduct online transactions and communications. These computing units or systems may take the form of a computer or set of computers, although other types of computing units or systems may be used, including laptops, notebooks, hand held computers, set-top boxes, workstations, computer-servers, main frame computers, mini-computers, PC servers, pervasive computers, network sets of computers, and/or the like. Practitioners will appreciate that web client 105 may or may not be in direct contact with a web server 115. For example, web client 105 may request and/or receive a dynamic frame web page 120 through another server, which may have a direct or indirect connection to web server 115.

As those skilled in the art will appreciate, web client 105 may include an operating system (e.g., Windows NT, 95/98/2000, OS2, UNIX, Linux, Solaris, MacOS, etc.) as well as various conventional support software and drivers typically associated with computers. The web client 105 may include any suitable personal computer, network computer, workstation, minicomputer, mainframe or the like. Web client 105 can be in a home or business environment with access to a network. In an exemplary embodiment, access is through a network or the Internet through a commercially available webbrowser software package.

Web client 105 may be independently, separately or collectively suitably coupled to the network via data links which includes, for example, a connection to an Internet Service Provider (ISP) over the local loop as is typically used in connection with standard modem communication, cable modem, Dish networks, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

System 90 contemplates uses in association with web services, utility computing, pervasive and individualized computing, security and identity solutions, autonomic computing, commodity computing, mobility and wireless solutions, open source, biometrics, grid computing and/or mesh computing.

Web server 115 and external web server 130 may each include any hardware and/or software suitably configured to facilitate communications between web client 105 and one or more portal web 110 and external web 125 components. Further, each web server may be configured to transmit data to web client 105 within markup language documents. Web servers may operate as single entities in a single geographic location or as separate computing components located together or in separate geographic locations. Requests originating from client browser 105 may pass through a firewall before being received and processed at web servers. As used herein, "transmit" may include sending electronic data from one system component to another over a network connection. Additionally, as used herein, "data" may include encompassing information such as commands, queries, files, data for storage, and the like in digital or any other form.

The web servers discussed herein may provide a suitable web site or other Internet-based graphical user interface which is accessible by users. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, InterBase, etc., may be used to provide an Active Data Object (ADO) compliant database management system.

Any of the communications, inputs, storage, databases or displays discussed herein may be facilitated through a web site having web pages. The term "web page" as it is used herein is not meant to limit the type of documents and applications that might be used to interact with the user. For example, a typical web site might include, in addition to standard HTML documents, various forms, Java applets, JavaScript, active server pages (ASP), common gateway interface scripts (CGI), extensible markup language (XML), dynamic HTML, cascading style sheets (CSS), helper applications, plug-ins, and the like. A server may include a web service that receives a request from a web server, the request including a URL (http://yahoo.com/stockquotes/ge) and an IP address (123.56.789). The web server retrieves the appropriate web pages and sends the data or applications for the web pages to the IP address. Web services are applications that are capable of interacting with other applications over a communications means, such as the Internet. Web services are typically based on standards or protocols such as XML, SOAP, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference.

System 90 may include any hardware and/or software suitably configured to facilitate storing web page content, transactional data, authentication data and the like. One skilled in the art will appreciate that system 90 may employ any number of databases in any number of configurations. Further, any databases discussed herein may be any type of database, such as relational, hierarchical, graphical, object-oriented, and/or other database configurations. Common database products that may be used to implement the databases include DB2 by IBM (White Plains, N.Y.), various database products available from Oracle Corporation (Redwood Shores, Calif.), Microsoft Access or Microsoft SQL Server by Microsoft Corporation (Redmond, Wash.), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one aspect of system 90, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In one exemplary embodiment, the ability to store a wide variety of information in different formats is facilitated by storing the information as a BLOB. Thus, any binary information can be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, in one exemplary embodiment of system 90, the data set (e.g., BLOB) may be annotated in a standard manner when provided for manipulating the data onto the financial transaction instrument. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a stand-alone interaction device configured to add, delete, modify, or augment the data in accordance with the header or trailer. As such, in one embodiment, the header or trailer is not stored on the transaction device along with the associated issuer-owned data but instead the appropriate action may be taken by providing to the transaction instrument user at the stand-alone device, the appropriate option for the action to be taken. System 90 may contemplate a data storage arrangement wherein the header or trailer, or header or trailer history, of the data is stored on the transaction instrument in relation to the appropriate data.

One skilled in the art will also appreciate that, for security reasons, any databases, systems, devices, servers or other components of system 90 may consist of any combination thereof at a single location or at multiple locations, wherein each database or system includes any of various suitable security features, such as firewalls, access codes, encryption, decryption, compression, decompression, and/or the like.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

System 90 and associated methods may be described herein in terms of functional block components, screen shots, optional selections and various processing steps. It should be appreciated that such functional blocks may be realized by any number of hardware and/or software components configured to perform the specified functions. For example, system 90 may employ various integrated circuit components, e.g., memory elements, processing elements, logic elements, look-up tables, and the like, which may carry out a variety of functions under the control of one or more microprocessors or other control devices. Similarly, the software elements of system 90 may be implemented with any programming or scripting language such as C, C++, Java, COBOL, assembler, PERL, Visual Basic, SQL Stored Procedures, extensible markup language (XML), with the various algorithms being implemented with any combination of data structures, objects, processes, routines or other programming elements. Further, it should be noted that system 90 may employ any number of conventional techniques for data transmission, signaling, data processing, network control, and the like. Still further, system 90 could be used to detect or prevent security issues with a client-side scripting language, such as JavaScript, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

These software elements may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, web pages, web sites, web forms, prompts, etc. Practitioners will appreciate that the illustrated steps described herein may comprise in any number of configurations including the use of windows, web pages, web forms, popup windows, prompts and the like. It should be further appreciated that the multiple steps as illustrated and described may be combined into single web pages and/or windows but have been expanded for the sake of simplicity. In other cases, steps illustrated and described as single process steps may be separated into multiple web pages and/or windows but have been combined for simplicity.

Benefits, other advantages, and solutions to problems have been described herein with regard to specific embodiments. However, the benefits, advantages, solutions to problems, and any element(s) that may cause any benefit, advantage, or solution to occur or become more pronounced are not to be construed as critical, required, or essential features or elements of any or all the claims or the invention. It should be understood that the detailed description and specific examples, indicating exemplary embodiments of the invention, are given for purposes of illustration only and not as limitations. Many changes and modifications within the scope of the instant invention may be made without departing from the spirit thereof, and the invention includes all such modifications. Corresponding structures, materials, acts, and equivalents of all elements in the claims below are intended to include any structure, material, or acts for performing the functions in combination with other claim elements as specifically claimed. The scope of the invention should be determined by the appended claims and their legal equivalents, rather than by the examples given above.

```
<%@ page import="java.util.*"%>
<html>
<head>
<title>Dynamic Page</title>
</head>
<p>A Sample page to create a two dimensional table dynamically
based on the number of rows and columns provided.</p>
<script type="text/javascript">
function SubmitForm( )
{
    var rows = Math.floor(Math.random( ) * 50);
```

-continued

```
    var cols = Math.floor(Math.random( ) * 50);
    if (document.frmDynPage.txtRows.value < 1)
        document.frmDynPage.txtRows.value = rows;
    if (document.frmDynPage.txtCols.value < 1)
        document.frmDynPage.txtCols.value = cols;
}
</script>
<BODY style="FONT-SIZE: 12px; FONT-FAMILY: sans-serif">
<FORM name=frmDynPage action="DynamicPage.jsp" method="post"
style="FONT-SIZE: 14px">
<TABLE cellSpacing=0 cellPadding=1 border=0 bgcolor=lightgrey>
    <TR>
    <TR>
    <TD bgcolor=lightgrey nowrap style="FONT-SIZE: 12px">Enter
number of rows to create</TD>
    <TD bgcolor=lightgrey><INPUT id=txtRows style="WIDTH: 60px"
name=txtRows value="0"></TD></TR>
    <TR>
    <TD bgcolor=lightgrey nowrap style="FONT-SIZE: 12px">Enter
number of columns to create</TD>
    <TD bgcolor=lightgrey><INPUT id=txtCols style="WIDTH: 60px"
name=txtCols value="0"></TD></TR>
    <TR>
    <TD><INPUT id=submit1 type=submit value=Submit name=submit1
onclick="javascript:SubmitForm( );"></TD></TR>
</TABLE>
<%
if(request.getMethod( ).equalsIgnoreCase("post")) {
    try {
        int i, j, rows, cols;
        rows = Integer.parseInt(request.getParameter("txtRows"));
        cols = Integer.parseInt(request.getParameter("txtCols"));
        out.println("Number of rows = " + rows + "<br>");
        out.println("Number of columns = " + cols + "<br>");
        out.println("<table border=1>");
        for (i=0; i < rows; i++)    {
            outprintln("<tr><td>" + (i+1) + "</td>");
            for (j=0; j < cols; j++) {
                out.println("<td>" + (j+1) + "</td>");
            }
            out.println("</tr>");
        }
        out.println
    }
    catch(Exception e)   {
        out.println("<br>ERROR:" + e + "<br>");
        e.printStackTrace(new PrintWriter(out));
    }
}
%>
</FORM>
<script language="javascript" src="SetFrameDim.js"
type=text/javascript></script>
</BODY>
</HTML>
```

What is claimed is:

1. A computer-implemented method for dynamically sizing an inline frame of a primary web page, having primary webpage content, to accommodate secondary web page content, said method including:
    transmitting a request to a server for said primary web page from said server, wherein said server:
        retrieves said primary web page content for said primary web page, wherein said primary web page content includes said inline frame;
        automatically reads a web source property of said inline frame, wherein said web source property identifies a source of said secondary web page content;
        requests said secondary web page content from said source;
        receives said secondary web page content from said source; and, transmits said primary web page including said primary web page content and said secondary web page content to said client;

receiving said primary web page including said primary web page content and said secondary web page content;

rendering said primary web page within a browser window at said client based on said primary web page content and said secondary web page content;

rendering said secondary web page content within said inline frame of said primary web page;

calling a first function to calculate secondary dimensions of said secondary web page content;

storing said secondary dimensions within a memory of said client;

receiving a trigger message when said rendering said secondary web page content reaches a predetermined level;

calling a second function to retrieve said dimensions from said memory;

setting attributes of said inline frame according to said secondary dimensions, wherein said attributes control a frame horizontal size and a frame vertical size of said inline frame;

resizing said inline frame in accordance with said attributes;

calling a third function to at least one of: increase and decrease a window horizontal size and a window vertical size of said browser window by a predetermined number of pixels;

re-rendering said primary web page content in accordance with said frame horizontal size and said frame vertical size of said inline frame; and, calling a fourth function to at least one of: said increase and said decrease said horizontal size and said vertical size of said browser window by said predetermined number of pixels.

2. The method of claim 1, wherein said step of calling a first function includes calculating height and width of said secondary web page content.

3. The method of claim 1, wherein said inline frame is an IFrame.

4. The method of claim 1, wherein said step of calling said second function is triggered by a state change event of said primary web page.

5. The method of claim 1, wherein said secondary dimensions are stored in a hidden field of said primary web page.

6. The method of claim 1, further including resizing primary dimensions of said primary web page when said secondary dimensions of said inline frame exceed said primary dimensions of said primary web page.

7. The method of claim 1, wherein said secondary dimensions are stored within a cookie.

8. The method of claim 1, further including storing a uniform resource locator (URL) of said secondary web page content within a cookie.

9. The method of claim 8, further including setting a source property of said inline frame to said URL from said cookie upon detecting a reload event of said primary web page.

10. A machine-readable medium having stored thereon a plurality of instructions for dynamically sizing an inline frame of a primary web page, having primary webpage content, to accommodate secondary web page content, said plurality of instructions when executed by at least one processor, cause said processor to perform a method comprising the step of:

transmitting a request to a server for said primary web page from said server, wherein said server:

retrieves said primary web page content for said primary web page, wherein said primary web page content includes said inline frame;

automatically reads a web source property of said inline frame, wherein said web source property identifies a source of said secondary web page content;

requests said secondary web page content from said source;

receives said secondary web page content from said source; and, transmits said primary web page including said primary web page content and said secondary web page content to said client;

receiving said primary web page including said primary web page content and said secondary web page content;

rendering said primary web page within a browser window at said client based on said primary web page content and said secondary web page content;

rendering said secondary web page content within said inline frame of said primary web page;

calling a first function to calculate secondary dimensions of said secondary web page content;

storing said secondary dimensions within a memory of said client;

receiving a trigger message when said rendering said secondary web page content reaches a predetermined level;

calling a second function to retrieve said dimensions from said memory;

setting attributes of said inline frame according to said secondary dimensions, wherein said attributes control a frame horizontal size and a frame vertical size of said inline frame;

resizing said inline frame in accordance with said attributes;

calling a third function to at least one of: increase and decrease a window horizontal size and a window vertical size of said browser window by a predetermined number of pixels;

re-rendering said primary web page content in accordance with said frame horizontal size and said frame vertical size of said inline frame; and, calling a fourth function to at least one of: said increase and said decrease said horizontal size and said vertical size of said browser window by said predetermined number of pixels.

11. A computer-implemented method for dynamically sizing an inline frame of a primary web page, having primary webpage content, to accommodate secondary web page content, said method including:

receiving a request for said primary web page from a client;

retrieving said primary web page content for said primary web page, wherein said primary web page content includes said inline frame;

automatically reading a web source property of said inline frame, wherein said web source property identifies a source of said secondary web page content;

requesting said secondary web page content from said source;

receiving said secondary web page content from said source;

calling a first function to calculate secondary dimensions of said secondary web page content;

setting attributes of said inline frame according to said secondary dimensions, wherein said attributes control a frame horizontal size and a frame vertical size of said inline frame;

resizing said inline frame in accordance with said attributes; and, transmitting said primary web page including said primary web page content and said secondary web page content to said client, wherein said client:

receives said primary web page including said primary web page content and said secondary web page content;

renders said primary web page within a browser window at said client based on said primary web page content and said secondary web page content;

renders said secondary web page content within said inline frame of said primary web page;

calls a second function to at least one of: increase and decrease a window horizontal size and a window vertical size of said browser window by a predetermined number of pixels;

re-renders said primary web page content in accordance with said frame horizontal size and said frame vertical size of said inline frame; and, calls a third function to at least one of: said increase and said decrease said horizontal size and said vertical size of said browser window by said predetermined number of pixels.

12. The method of claim 11, wherein said step of calling a first function includes calculating a height and a width of said secondary web page content.

13. The method of claim 11, wherein said inline frame is an IFrame.

14. The method of claim 11, wherein said secondary dimensions are stored in a hidden field of said primary web page.

15. The method of claim 11, further including resizing primary dimensions of said primary web page when said secondary dimensions of said inline frame exceed said primary dimensions of said primary web page.

16. The method of claim 11, wherein said secondary dimensions are stored within a cookie.

17. The method of claim 11, further including storing a uniform resource locator (URL) of said secondary web page content within a cookie.

18. The method of claim 17, further including setting a source property of said inline frame to said URL from said cookie upon detecting a reload event of said primary web page.

* * * * *